United States Patent [19]
McDaniel

[11] 4,242,954
[45] Jan. 6, 1981

[54] CALENDAR ROLL SYSTEM

[75] Inventor: Gordon L. McDaniel, Graham, Tex.

[73] Assignee: Graham Magnetics Incorporated, North Richmond Hills, Tex.

[21] Appl. No.: 908,644

[22] Filed: May 23, 1978

[51] Int. Cl.³ .................................................. B30B 3/04
[52] U.S. Cl. ........................................ 100/176; 29/132
[58] Field of Search ................. 100/155, 162 B, 176, 100/37; 29/132; 148/11.5 R; 75/170, 175.5; 428/660; 226/190, 191, 193, 186

[56] References Cited

U.S. PATENT DOCUMENTS

| B 432,991 | 3/1976 | Cumbers | 100/162 B |
|---|---|---|---|
| 2,964,251 | 12/1960 | Samuels et al. | 29/132 X |
| 3,174,851 | 3/1965 | Buehler et al. | 75/170 |
| 3,351,463 | 11/1967 | Rozner et al. | 75/170 |
| 3,558,369 | 1/1971 | Wang et al. | 148/11.5 R |
| 3,900,939 | 8/1975 | Greacen | 148/11.5 R |
| 4,035,007 | 7/1977 | Harrison et al. | 75/170 |
| 4,065,044 | 12/1977 | Painter et al. | 29/132 |
| 4,149,911 | 4/1979 | Clabburn | 148/11.5 R |

*Primary Examiner*—Billy J. Wilhite
*Attorney, Agent, or Firm*—Robert A. Cesari; John F. McKenna; Andrew F. Kehoe

[57] ABSTRACT

A high-precision, metal-faced, calendar roll which can be readily reconditioned by thermal means. The calendar roll has a surface which is advantageously formed of that class of nickel-titanium alloys having thermally-responsive shape memory properties. The calendar roll is particularly useful in avoiding time consuming repair and undesirably prolonged runs in making high quality magnetic tape.

6 Claims, 3 Drawing Figures

CALENDAR ROLL SYSTEM

BACKGROUND OF THE INVENTION

The invention relates to forming a novel calender roll apparatus of the type used in web-processing to assure an excellent finish to the web being subjected to the calendering action.

Although calendering of some webs, e.g. paper, may be relatively non-critical operations, there are many problems involved in critical calendering operations, e.g. those in which high-quality magnetic tape is calendered.

In such calendering, the magnetic tape web is pressed between two rolls. The rolls are being pressed together by forces of the order of 50,000 pounds. The coating is densified and smoothed by this process. There are two general categories:

(i) The two rolls are the same material, e.g. steel against steel;
(ii) The two rolls are of different material, e.g. steel against cotton, plastic, rubber, paper, etc.

In the first situation, the problem is that the steel rolls must be very carefully made, to be sure that they give uniform pressure against the tape surface. Some manufacturers will keep their spare rolls turning 24 hours a day to avoid sag caused by gravity deforming the rolls. Such deforming can cause alternately smooth and rough surfaces as the roll is rotated against the sheet being calendered. Also, any crease or irregularity in the web can so damage a steel roll, that it must be turned down, chrome plated again, and polished. The advantages of steel rolls on calenders is their ability to withstand high pressures in the nip and better heat transfer.

In the second situation, the compliant roll solves many of the mechanical problems of alignment and careful tolerances. Other problems are presented by compliant-surfaced rolls. Such rolls, typically of paper and cotton, are not very strong, so nip pressures must be low. They break down and have to be reground and replaced. A crease in the web will mar the surface of the roll and it will have to be reground. Plastic-faced rolls have been tried and they are successfully used. However, advantageous use of plastic is limited to lower operating temperatures. As the calender turns, the deformation of the compliant roll manifests itself in generating of heat. Plastic and cotton are poor materials for use in removing such heat; they have low thermal conductivity. The result is that the heat builds up at the edges of the roll and the roll gets even softer at such cites, causing more deformation and still more heat build-up along the edges. The edge of the web may reach 40° F. or 50° F. above the middle of the roll. Non-uniform expansion of the roll and non-uniform webs result.

Soft metal surfaces have been tried for complaint rolls. This causes lots of problems because the surfaces are usually not corrosion resistant under plant operating conditions. Again, a crease in the web being processed "wipes out" the roll and necessitates regrinding and refinishing. In general, it may be said that critical calender operations in the prior art relating to magnetic tape use two to five nips with one relatively compliant roll at each nip.

Another aspect of earlier art, one heretofore unrelated to calender design, is the existence of certain titanium/nickel alloys. These materials have been called NITINOL materials because of their nickel and titanium content and the fact that they were developed at the Navel Ordinance Laboratories. The material has been very expensive, on the order of 100 to 1,000 times as expensive as metals. Its use has been heretofore restricted to such applications as small, highly-critical connections for electrical applications such as those required by the U.S. Navy to operate at 6,000 psi or 3,000 psi in temperature of 65° F. to 575° F. Another application which may have become commercial is the use of such materials in formation of dental braces. Various such materials, or related materials, are disclosed in, or discussed in, U.S. Pat. Nos. 3,352,650; 3,174,851; 3,558,369; and 3,660,082.

Still another aspect of earlier art, an aspect not heretofore related to the aforesaid alloy art, is the manufacture of magnetic tape. Of course, it was well known that one should calender tape and that one had to refurbish calender rolls occasionally. However, the value of consistently good calender performance was not believed to have been fully appreciated. Yet, it is an important aspect of this invention that such performance is recognized to be very valuable and to justify the relatively high cost of the aforesaid NITINOL materials in calender applications.

It is emphasized that this section on the prior art is prepared in hindsight with full knowledge of the invention disclosed below. Thus, no pre-existing relationship of disparate elements of the prior art is to be construed from this section.

SUMMARY OF THE INVENTION

Therefore, it is a principal object of the invention to provide an improved calender, one which is readily and inexpensively refurbished.

Another object of the invention is to provide a calender system comprising two such rolls.

A further object of the invention is to provide a means for facilitating the economic manufacture of consistently superior magnetic tape and to provide an improved process for making such tape without the need of removing a calender roll from the like during the manufacturing process.

Other objects of the invention will be obvious to those skilled in the art on their reading of this disclosure.

The above objects are achieved by the formation and utilization of a calender roll comprising as the surface thereof a thin layer of a metal alloy, advantageously a NITINOL alloy, which has a "shape-memory" because it actually "remembers" its original shape after being plastically deformed and returns to this shape when later heated above a transformation temperature.

The NITINOL material having "shape-memory" characteristics has a number of advantages:

1. If creased, the material has memory and will come back to its original shape on heating of the calender roll.
2. The basic mechanical and thermal properties of these alloys fit the application in an extraordinary way. They are softer than the steel roll but much harder than the other compliant roll choices and they are non-magnetic. They have good thermal conductivity far better than the thermal conductivity of plastic, paper or felt rolls.
3. The NITINOL alloy has extraordinary resistance to corrosive attack. The copper oxide, or lead oxide, associated with other soft metals will not occur. The material does not crack as the result of stress corrosion.

These properties are particularly important during the processing of magnetic tape, e.g. a web consisting of a polyester substrate carrying a resin coating in which is dispersed magnetic particles. For example, the NITINOL alloys useful in the invention, or any equivalent alloy, are sufficiently harder than the tape being processed to represent a major advantage over other complaint rolls. Thus, not only is it possible to achieve a relatively quick repair of the roll, it is possible to avoid the need for such repair for a longer period of time.

These factors translate into making it economically feasible to produce a more dependably calendered (and therefore more dependably compacted and defect free) magnetic tape. This means improved short wave performance of the tape at high frequencies—this believed to result from an increase in density of the recording medium on the tape and, also, the ability to have the recording head closer to the tape which, because of the better compaction, has fewer and less severe asperities. Indeed, the major advance achieved by use of the invention is believed to be the ability to consistently and economically manufacture a magnetic tape with an improvement in magnetic signal processing characteristics rather than the more dramatic advantage of contributing to relatively simple maintenance procedures by utilizing a "shape-remembering" metal.

It is one advantage of the invention that, for the first time, it is possible to use two compliant rolls, e.g. two NITINOL rolls to form a calender nip. Moreover, whereas it has heretofore been the practice to use three or four nips to calender a magnetic tape web, it is now possible to achieve such calendering with two nips or even one nip.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

In The Drawings

Figure 1:
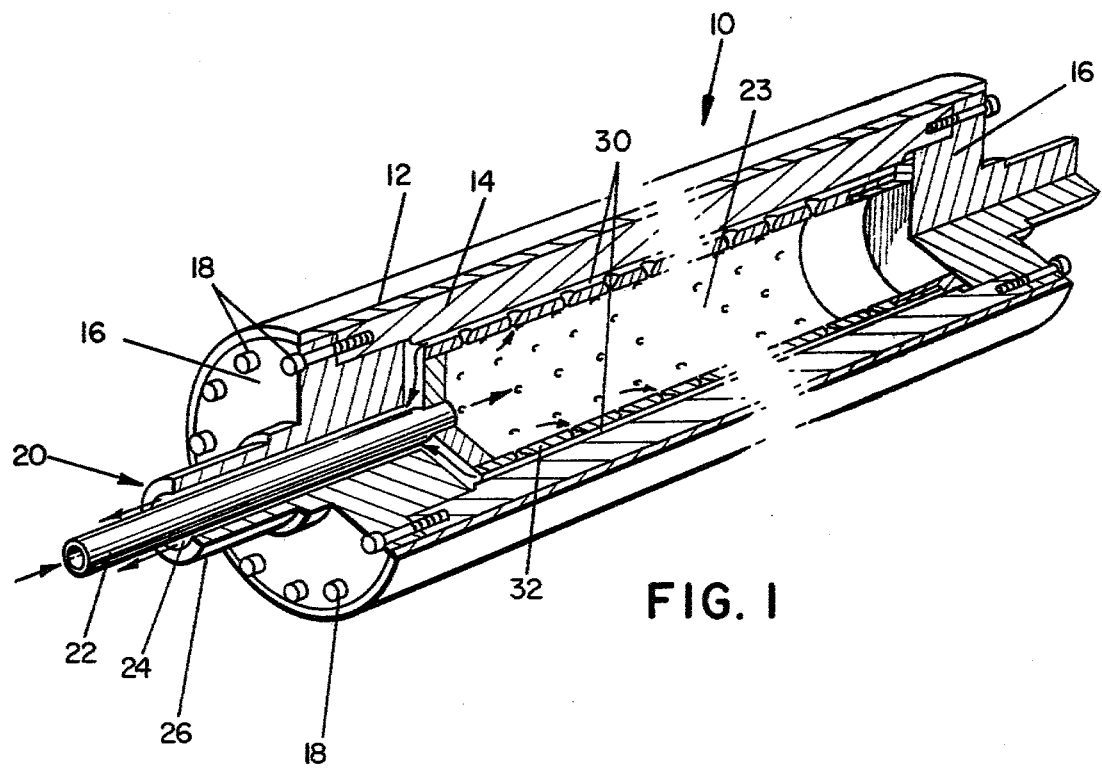
FIG. 1 is a perspective, somewhat schematic and partially in section, of a calender roll constructed according to the invention.

Referring to FIG. 1, it is seen that as otherwise conventional, cooled calender roll 10 is formed of an exterior sleeve 12 of 3/16-inch thickness of a NITINOL alloy obtained from Raychem Corporation and characterized by an ability to heal plastic imperfections, such as minor indentations at a temperature below 120° C. The sleeve is supported on a cylindrical support shell member 14 which is contained by circular heads 16 fastened into member 14 by bolts 18. A concentric pipe system 20 comprises a fluid inlet pipe 22 and a fluid outlet conduit 24, the conduit being formed by the exterior of pipe 22 and the interior of journal member 26. This system 20 allows heating or cooling fluid to be circulated through reservoir 23 and thence to an annular passage 30 between perforated tube 32 and shell member 14.

A small ball bearing, e.g. a bearing of about 3/16-inch diameter was hammered against sleeve 12 to cause a dimple therein. Thereupon, the sleeve can be heated to 125° C. whereupon the dimple wholly disappears.

Figure 2:
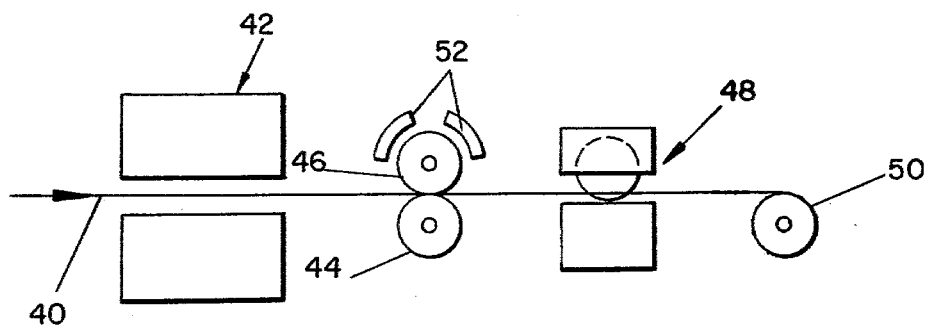
FIGS. 2 and 3 are schematic diagrams of a calendering system according to the invention.

FIG. 2 illustrates a system wherein magnetic tape 40 from a coating line enters an oven 42 and is then calendered between a steel roll 44 and a hot-oil heated compliant roll 46 comprising a NITINOL sleeve, thence through a slitter mechanism 48 and into spools 50. For the first time, it is possible to use a metallic compliant roll and to heal any imperfections therein by simple heat-treatment of the roll in-place, e.g. by use of radiant heaters such as ultra-violet lights 52.

It will be understood that the number of nips and rolls in the calender can be increased to, e.g. five rolls and four nips. However, it is believed that two, or even one, nip is made of a NITINOL-type, memory-type, metal.

Figure 3:
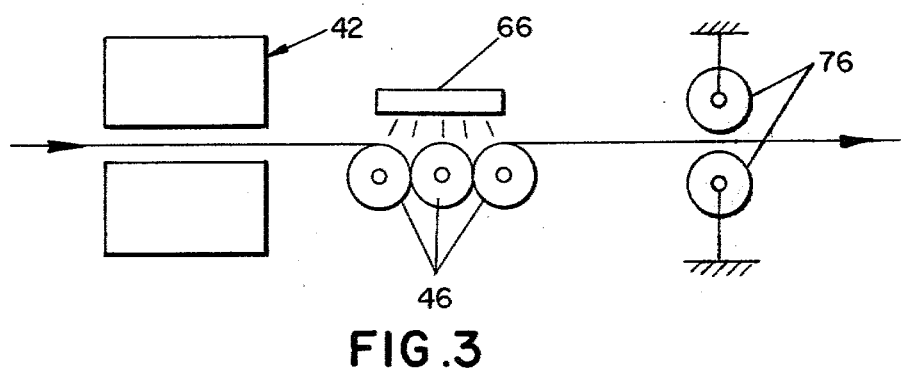

In one advantageous embodiment of the invention, a "space calender" is incorporated into the web processing equipment and when one calender needs refurbishing, the web is transferred through a second calender. Thus, as seen in FIG. 3, a first calender comprising NITINOL rolls 46, is being refurbished by radiant heaters 66, an alternate calender system can be brought into use by closing the nip between NITINOL rolls 76.

It is also to be understood that the following claims are intended to cover all of the generic and specific features of the invention herein described and all statements of the scope of the invention which might be said to fall therebetween.

What is claimed is:

1. A calender roll system, having (A) as a compliant roll thereof, a calender roll comprising, as a surface thereover, a sleeve of a shape-memory alloy which is plastically deformable characterized by an ability after its surface is marred, to return to its original shape after being heated at a transformation temperature; and (B) a second roll forming means adjacent said compliant roll to force a web against said compliant roll.

2. A calender system as defined in claim 1 wherein said compliant roll is formed of a NITINOL alloy.

3. A calender system as defined in claim 2 wherein said transformation temperature is 125° C. or less.

4. A calender system as defined in claim 3 wherein said calender roll is formed of a NITINOL alloy.

5. A calender system as defined in claim 3 wherein said second roll is also formed of a shape-memory alloy characterized by an ability to return to its original shape after being heated at a transformation temperature.

6. A calender system as defined in claim 1 wherein said second roll is also formed of a shape-memory alloy characterized by an ability to return to its original shape after being heated at a transformation temperature.

* * * * *